(12) United States Patent
Li

(10) Patent No.: US 10,701,435 B2
(45) Date of Patent: *Jun. 30, 2020

(54) TELEVISION VIDEO INTERCEPTION METHOD AND DEVICE

(71) Applicant: TENCENT TECHNOLOGY (SHENZHEN) COMPANY LIMITED, Shenzhen, Guangdong (CN)

(72) Inventor: Zhong Wei Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/356,020

(22) Filed: Mar. 18, 2019

(65) Prior Publication Data

US 2019/0215558 A1    Jul. 11, 2019

Related U.S. Application Data

(63) Continuation of application No. PCT/CN2017/114538, filed on Dec. 5, 2017.

(30) Foreign Application Priority Data

Dec. 8, 2016  (CN) .......................... 2016 1 1127913

(51) Int. Cl.
*H04N 21/433* (2011.01)
*H04N 21/235* (2011.01)
(Continued)

(52) U.S. Cl.
CPC ..... *H04N 21/4334* (2013.01); *H04N 21/2353* (2013.01); *H04N 21/4221* (2013.01);
(Continued)

(58) Field of Classification Search
CPC .......... H04N 21/2353; H04N 21/4221; H04N 21/4334; H04N 21/44008; H04N 21/4622; H04N 21/47214
(Continued)

(56) References Cited

U.S. PATENT DOCUMENTS

2007/0216807 A1* 9/2007 Otsuka ..................... H04N 5/45
                                                          348/565
2011/0264793 A1* 10/2011 Goldman ............... H04H 20/82
                                                          709/224
(Continued)

FOREIGN PATENT DOCUMENTS

CN          103096182 A    5/2013
CN          104796795 A    7/2015
(Continued)

OTHER PUBLICATIONS

International Search Report for PCT/CN2017/114538 dated Feb. 5, 2018 [PCT/ISA/210].

*Primary Examiner* — Thai Q Tran
*Assistant Examiner* — Stephen R Smith
(74) *Attorney, Agent, or Firm* — Sughrue Mion, PLLC

(57) ABSTRACT

A method and system are provided. The method includes obtaining a television video from a background server and displaying the television video. A capture instruction for the television video is received from a remote control device. In response to receiving the capture instruction, the capture instruction is transmitted to the background server, and a video capture mode is entered.

17 Claims, 16 Drawing Sheets

(51) Int. Cl.
  *H04N 21/462*  (2011.01)
  *H04N 21/44*   (2011.01)
  *H04N 21/472*  (2011.01)
  *H04N 21/422*  (2011.01)

(52) U.S. Cl.
  CPC ... *H04N 21/44008* (2013.01); *H04N 21/4622* (2013.01); *H04N 21/47214* (2013.01)

(58) Field of Classification Search
  USPC .......... 386/248, 278, 291; 348/564; 715/273
  See application file for complete search history.

(56) References Cited

U.S. PATENT DOCUMENTS

| | | | |
|---|---|---|---|
| 2015/0046806 A1* | 2/2015 | Anderson | G06F 3/0483 715/273 |
| 2016/0323647 A1* | 11/2016 | Yan | H04N 21/27 |
| 2017/0257651 A1* | 9/2017 | Zhu | H04N 21/2387 |
| 2018/0078862 A1* | 3/2018 | Schleicher | A63F 13/86 |
| 2018/0268870 A1* | 9/2018 | Chen | H04N 21/274 |

FOREIGN PATENT DOCUMENTS

| | | | |
|---|---|---|---|
| CN | 105657498 A | 6/2016 | |
| CN | 106550264 A | 3/2017 | |
| WO | 2015/096648 A1 | 7/2015 | |

\* cited by examiner

TELEVISION VIDEO INTERCEPTION
METHOD AND DEVICE

CROSS REFERENCE TO RELATED
APPLICATIONS

This application is a continuation of International Patent Application No. PCT/CN2017/114538, which claims priority from Chinese Patent Application No. 201611127913.5, filed with the Chinese Patent Office on Dec. 8, 2016, and entitled "METHOD AND APPARATUS FOR CAPTURING TELEVISION VIDEO", the entire contents of each of which are incorporated by reference herein in their entirety.

BACKGROUND

1. Field

Methods, apparatuses, and articles of manufacture consistent with the present disclosure relate to the field of video technologies, and in particular, to a method and an apparatus for capturing a television video.

2. Description of Related Art

Network set top boxes are now used in more and more families. People find some interesting video content when watching videos, and hope to capture a video clip of the interesting video content and/or to save or share, on a social network or a cloud storage network, the interesting video content just watched.

However, various related art video capture software is generally operated on computers or mobile terminals and cannot be applied to televisions. Therefore, a user cannot capture a television program clip that the user is fond of while watching television.

SUMMARY

It is an aspect to provide a method and an apparatus for capturing a television video, and a non-volatile computer-readable storage medium related thereto.

According to an aspect of one or more embodiments, there is provided a method including obtaining a television video from a background server and displaying the television video. A capture instruction for the television video is received from a remote control device. In response to receiving the capture instruction, the capture instruction is transmitted to the background server, and a video capture mode is entered.

According to other aspects of one or more embodiments, there is also provided a system and computer-readable medium consistent with the method.

BRIEF DESCRIPTION OF THE DRAWINGS

Embodiments will be described below with reference to the accompanying drawings, in which.

DETAILED DESCRIPTION

To make technical solutions and advantages of embodiments clearer, the following further describes implementations of the present disclosure in detail with reference to the accompanying drawings.

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

It should be noted that terms in the specification and claims of the present disclosure and the foregoing accompanying drawings such as "first" and "second" are used to differentiate similar objects, and are not necessarily used to describe a particular sequence or an order. It should be understood that, data used in this way is exchangeable in a proper case, so that the embodiments described herein can be implemented in another order except those shown or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

According to the exemplary embodiments, a method for capturing a television video is provided. It should be noted that steps shown in the flowcharts of the accompanying drawings may be performed in a computer system of a set of computer-executable instructions, and although a logic sequence is shown in the flowchart, in some cases, the shown or described steps may be performed in an order different from the sequence herein.

Figure 1A:
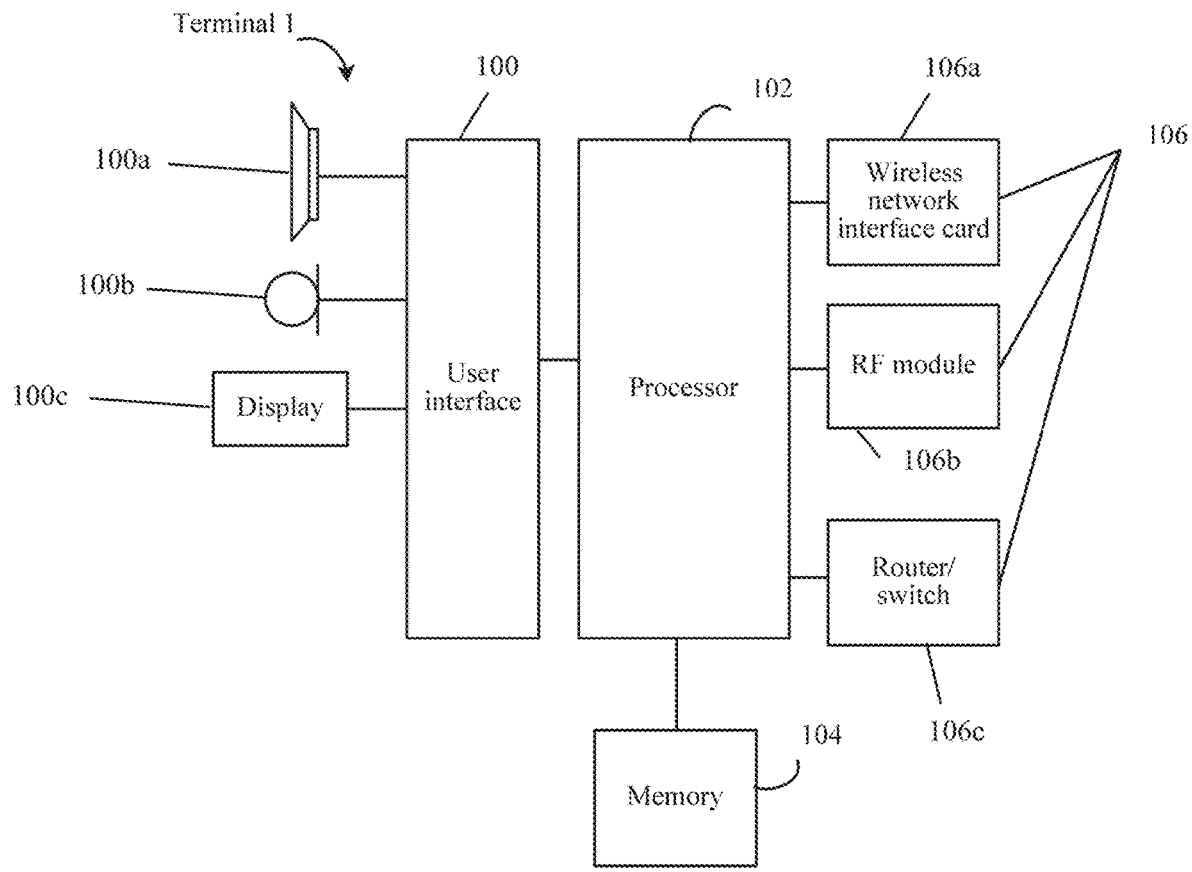
FIG. 1A is a structural hardware block diagram of a terminal used for implementing a method for capturing a television video according to an embodiment.

The method provided in the exemplary embodiments is applicable to capturing of a television video being played on a television terminal or a computing device with a function similar to that of a television terminal. For example, the method is applied to capturing of a television video being played on a television terminal. FIG. 1A is a structural hardware block diagram of a terminal used for implementing a method for capturing a television video according to an embodiment. As shown in FIG. 1A, a terminal 1 may be a television terminal, including one or more (only one is shown in FIG. 1A) processors 102, a memory 104 configured to store data, and a transmission apparatus 106 configured to implement a communication function. The terminal 1 may also include a speaker 100a, a microphone 100b, and a display 100c connected wirelessly or in a wired manner to a user interface 100. The user interface 100 may be connected to the processor 102, or in some instances may be implemented by the processor 102. The processor 102 may include but is not limited to a processing device such as a microprocessor MCU or a programmable logic device FPGA. It may be understood by a person of ordinary skill in the art that the structure shown in FIG. 1A is merely illustrative and does not constitute any limitation on a structure of the foregoing electronic device. For example, the terminal 1 may also include more or fewer components than those shown in FIG. 1A, or have a configuration different from that shown in FIG. 1A.

The memory 104 may be configured to store program code of application software and a module, for example, some program code/modules corresponding to the method for capturing a television video in the exemplary embodiments. The processor 102 runs the program code and/or modules that are stored in the memory 104, to process various function application and data, and assist a background server in implementing the foregoing method for capturing a television video. The memory 104 may include a high-speed random memory, and may also include a non-volatile memory such as one or more magnetic storage devices, a flash memory, or another non-volatile solid-state memory. In some instances, the memory 104 may further include memories remotely disposed relative to the processor 102, and these remote memories may be connected to the terminal 1 through a network. Instances of the network include but are not limited to the Internet, an intranet, a local area network, a mobile communications network, and a combination thereof.

The transmission apparatus 106 is configured to receive or send data through a network. A specific instance of the foregoing network may include a wireless network provided by a network operator of the terminal 1. In an instance, the transmission apparatus 106 includes a network interface controller (NIC) that may be connected to another network device, thereby communicating with the Internet. In an instance, the transmission apparatus 106 may be a radio frequency (RF) module 106a, configured to communicate with another device, for example, a remote control device, in a wireless manner. In another instance, the transmission apparatus may alternatively be a wireless network interface card 106a or a router/switch 106c. It will be appreciated that the transmission apparatus 106 may in some instances include the wireless network interface card 106a, the RF module 106b, and the router/switch 106c.

Figure 1B:
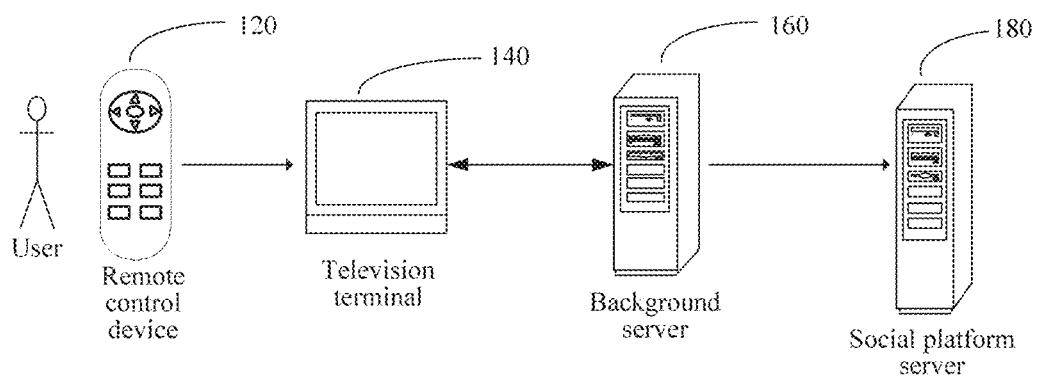
FIG. 1B is a schematic diagram of an implementation environment of a method for capturing a television video according to an embodiment.

FIG. 1B is a schematic diagram of an implementation environment of a method for capturing a television video according to an embodiment. The implementation environment includes: a remote control device 120, a television terminal 140, and a background server 160. The implementation environment may further include a social platform server 180.

The remote control device 120 is configured to: receive an instruction of a user, and transmit the instruction to the television terminal 140.

The television terminal 140 is connected to the background server 160 and is configured to: display a television video, an interface on which the television terminal 140 interacts with the remote control device 120, and information for the user, and forward the instruction received from the remote control device 120 to the background server 160. For a hardware structure of the television terminal 140, refer to FIG. 1A.

The background server 160 may be a medium storage server and is configured to: store a television video and data related to the television video, perform an operation on the television video according to the received instruction of the television terminal 140, and exchange information with the social platform server 180.

The social platform server 180 is configured to share the information received from the background server 160 on a related social platform.

Figure 1C:
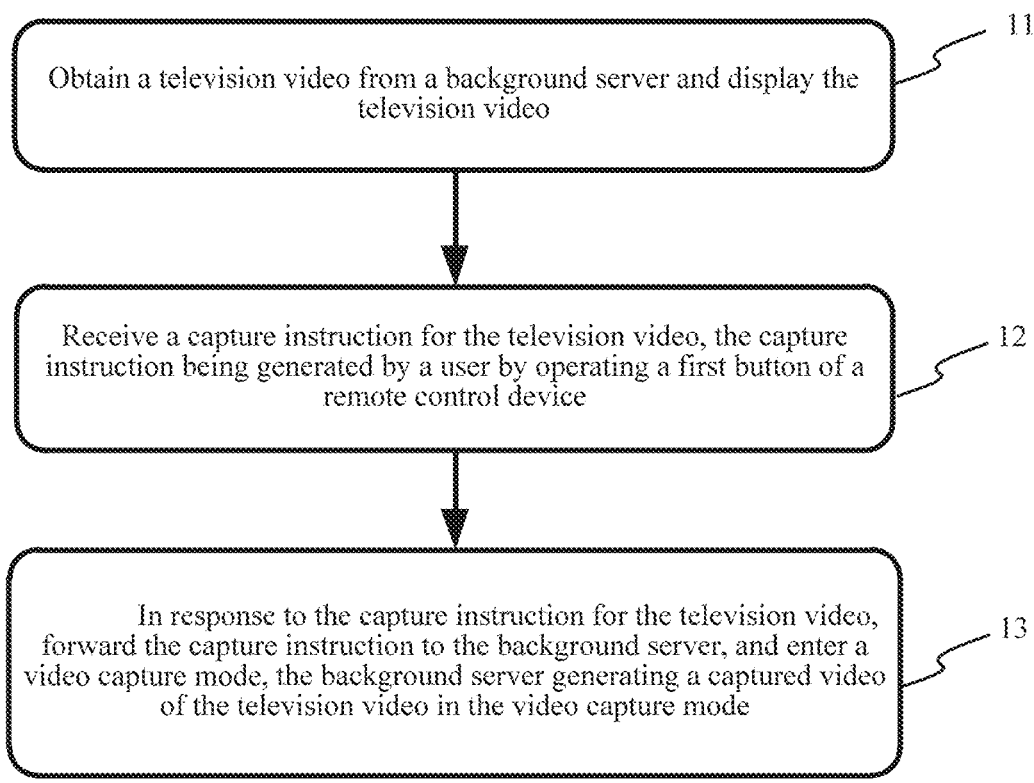
FIG. 1C is a flowchart of a method for capturing a television video according to an embodiment.

According to the implementation environment shown in FIG. 1B, an embodiment provides a method for capturing a television video shown in FIG. 1C. The method for capturing a television video is applicable to capturing of a television video played on the television terminal shown in FIG. 1B. The terminal may be an intelligent terminal device, and a processor in the intelligent terminal device assists the background server in performing the method for capturing a television video. The intelligent terminal device may be an Internet television all-in-one machine, a set top box+a television, or the like, collectively referred to as a television terminal. At least one application program is installed in the intelligent terminal device. A type of the application program is not limited in this embodiment. The application program may be a system application program, or a software application program. The application program in this embodiment includes at least one application function.

Referring to FIG. 1C, FIG. 1C is a flowchart of a method for capturing a television video according to an embodiment. The method is applicable to a television terminal, and includes the following steps:

Step 11. Obtain a television video from a background server and display the television video.

In this embodiment, for the television terminal, for example, a television, a network set top box is configured, and a television terminal application program provided by a service provider is installed, so that a television video may be obtained from a background server of the service provider, and a user can watch on line the television video provided by the service provider. The television can play the television video on line by using the television terminal application program. In an instance, the television terminal application program may be a Tencent television terminal video application (APP). The Tencent television terminal video APP provides a function of a television video player, and can play a television video in full-screen mode.

In this embodiment, the user may search for the television video on line by using the television terminal application program. When the television video is found, the television terminal application program installed on the television may obtain the television video from the background server, and play the television video on line for the user.

In this embodiment, the television terminal application program installed on the television is used to determine a television video on which video capture is to be performed, so that the television video is obtained from the background server.

Step 12. Receive a capture instruction for the television video, the capture instruction being generated by a user by operating a first button of a remote control device.

If the user notices interesting video content when watching a television video, the user may want to capture the interesting video content in the television video. In this embodiment, to obtain the interesting video content, the first button used for capturing a television video may be disposed in the remote control device. The user may operate the first button of the remote control device to send a capture instruction or a stop capture instruction for the television video to the television, so as to capture the television video. That is, in an instance, the user may operate the first button to start video capture, and operate the first button again to stop the video capture that has been started. The television receives the capture instruction sent by the remote control device for capturing the television video. The capture instruction is used for instructing to capture the television video. After receiving the capture instruction, the television forwards the capture instruction to the background server, and the background server captures the television video. After receiving the stop capture instruction, the television forwards the stop capture instruction to the background server, and the background server stops capturing the television video. In an instance, the capture instruction may be generated by long pressing the first button of the remote control device. When long pressing of the first button of the remote control device stops, the capture instruction is cancelled. In other words, the stop capture instruction is generated.

After the capture instruction is generated, for example, by long pressing the first button of the remote control device, the background server starts to capture the television video. In this case, a corresponding capture button may be displayed on a playback page of the television video, and a color and/or an animation changes to notify the user that video capture is being performed by long pressing the first button of the remote control device. For example, in an instance, after the capture button is displayed, the color changes to orange, or a water ripple animation appears around the capture button, or the color of the capture button changes to orange and a water ripple animation appears around the capture button.

In this embodiment, the first button of the remote control device may be operated in various manners to generate the capture instruction for the television video. The foregoing manner of generating the capture instruction by long pressing the first button of the remote control device is merely an example embodiment, and does not represent that this embodiment includes only the foregoing manner of generating the capture instruction. No additional detailed examples are provided herein for conciseness.

In this embodiment, after obtaining the television video from the background server, the television receives the capture instruction for the television video and forwards the capture instruction to the background server, so that the background server may capture the television video.

Step 13. In response to the capture instruction for the television video, forward the capture instruction to the background server, and enter a video capture mode, the background server generating a captured video of the television video in the video capture mode.

In this embodiment, after receiving the capture instruction for the television video, the television may respond to the capture instruction for the television video and enter the video capture mode. After the television enters the video capture mode in which the color and/or the animation changes as discussed above, the background server may perform an operation related to the television video, such as starting to capture the television video, suspending capturing of the television video, or viewing a capturing status of the television video. Before the background server receives the capture instruction, the television video is in an uncaptured state. After receiving the capture instruction, the background server captures the television video, and the television video is in a capturing state. After receiving the stop capture instruction, the background server stops capturing the television video. For example, in an instance, the user long presses the first button of the remote control device to generate the capture instruction, and capturing of television video starts. When the user releases the first button of the remote control device, the stop capture instruction is generated, and capturing of the television video stops.

In this embodiment, after obtaining the television video, the television receives and responds to the capture instruction for the television video, forwards the capture instruction to the background server, and enters the video capture mode. The background server captures the television video in the video capture mode, and generates the captured video of the television video.

Figure 1D:
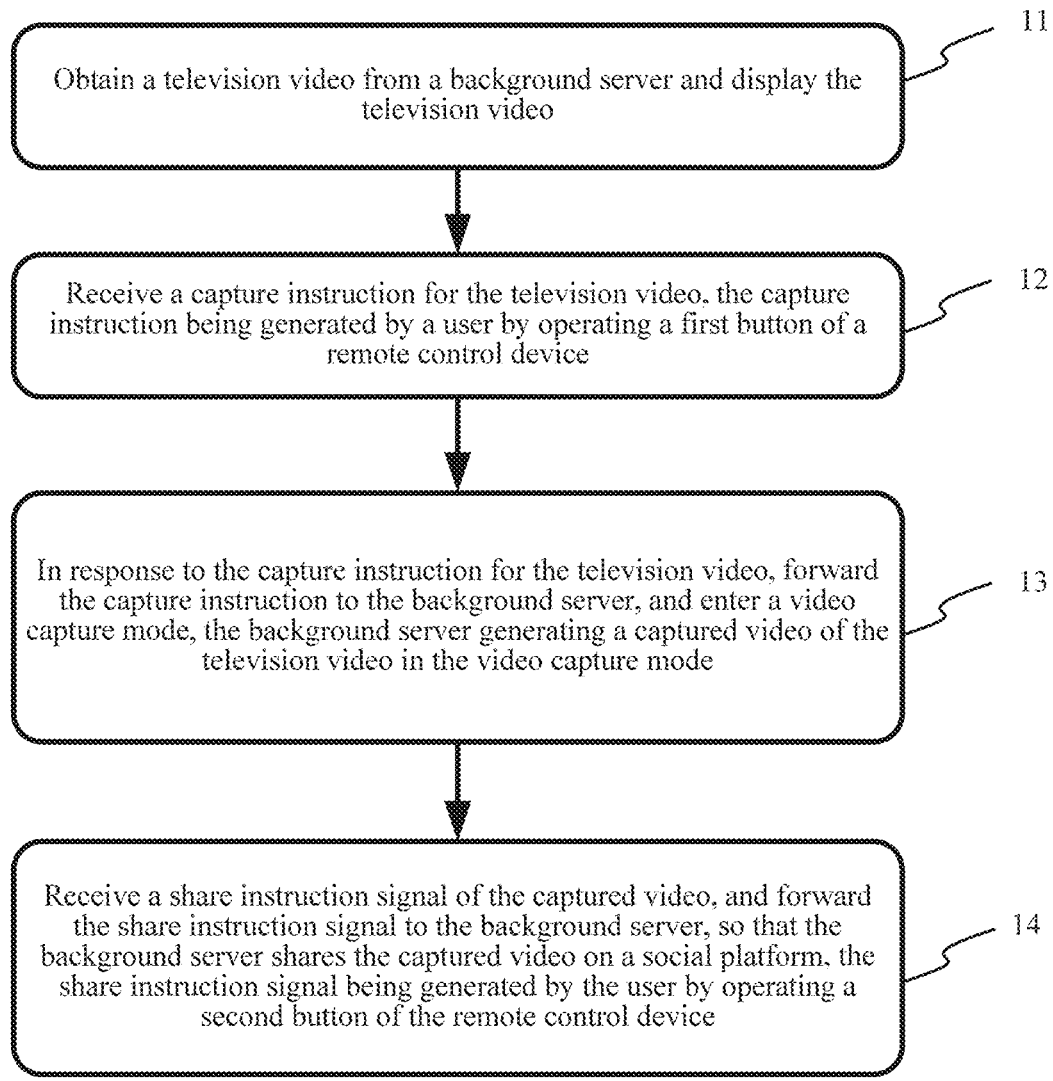
FIG. 1D is another flowchart of a method for capturing a television video according to an embodiment.

In this embodiment, step 14 is further included after the generating a captured video of the television video in step 13, referring to FIG. 1D. In FIG. 1D, steps 11-13 are the same as in FIG. 1C and therefore a repeated description thereof is omitted for conciseness.

Step 14. Receive a share instruction signal of the captured video, and forward the share instruction signal to the background server, so that the background server shares the captured video on a social platform, the share instruction signal being generated by the user by operating a second button of the remote control device.

In this embodiment, after the background server generates the captured video of the television video, the user may operate the second button of the remote control device to share the captured video on the social platform. In some instances, the second button may be different than the first button. The social platform on which the captured video is shared includes but is not limited to a social platform such as MediaHub, Sina Weibo, Tencent Weibo, Qzone, or WeChat moments.

In this embodiment, a corresponding share button may be displayed on a playback page of the television video, and a color or an animation changes to notify the user that the video captured is being shared by operating the second button of the remote control device. For example, after the share button is displayed, the color changes to orange, or a water ripple animation appears around the share button, or the color of the share button changes to orange and a water ripple animation appears around the share button. Sharing prompt information, for example, prompt information of "Capturing completes, share the small video to:", may be displayed on the playback page of the television video. The user may enter account information on the social platform by using the remote control device to share the captured video.

Figure 2:
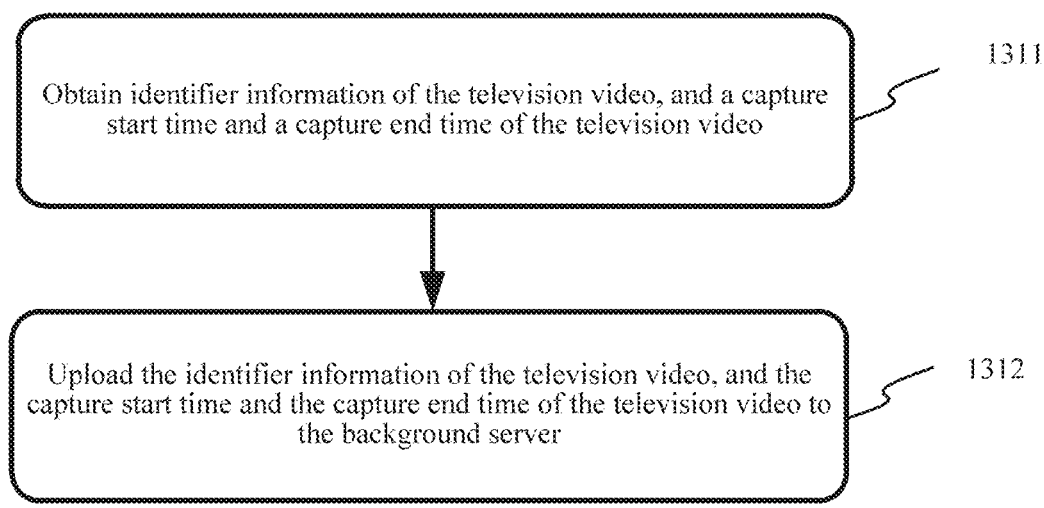
FIG. 2 is a flowchart of a method for entering a video capture mode in response to a capture instruction according to an embodiment.

Referring to FIG. 2, in an implementation, the entering a video capture mode in response to the capture instruction for the television video may include the following steps:

Step 1311. Obtain identifier information of the television video, and a capture start time and a capture end time of the television video.

The television video has the identifier information, and the identifier information is information used for uniquely determining the television video. In this embodiment, the identifier information of the television video may include, for example, a television video name.

The capture start time and the capture end time of the television video may be determined according to the received start capture instruction and the received stop capture instruction for the television video. For example, in an instance, when the user long presses the first button of the remote control device to generate the capture instruction, and the capture instruction is received by the television, the time that the capture instruction is received by the television may be determined as the capture start time of the television video. When the user releases the first button of the remote control device to cancel the capture instruction, that is, the stop capture instruction is generated, and the stop capture instruction is received by the television, the time that the stop capture instruction is received by the television may be determined as the capture end time of the television video.

Step 1312. Upload the identifier information of the television video, and the capture start time and the capture end time of the television video to the background server.

In this embodiment, the background server may search for a television video corresponding to the identifier information of the television video, and generate the captured video of the television video according to the capture start time and the capture end time of the television video. Alternatively, the background server may search for a video clip corresponding to the identifier information of the television video, and the capture start time and the capture end time of the television video, and generate the captured video of the television video according to the found video clip. In other words, in this embodiment, the background server waits to receive the identifier information, and the start and end times, and then locates the video identified by the video identifier information and generates the clip using the start and end times, or by looking for a previously generated video clip with the same identifier information, the same start time and the same end time. In this way, television processing resources are saved by offloading the video clip generation to the background server. Alternatively, in another instance, the background server may obtain the identifier information, the capture start time, and the capture end time from the television at a time when their operation is generated (i.e., rather than waiting for all the information to be sent at the same time).

Figure 3:
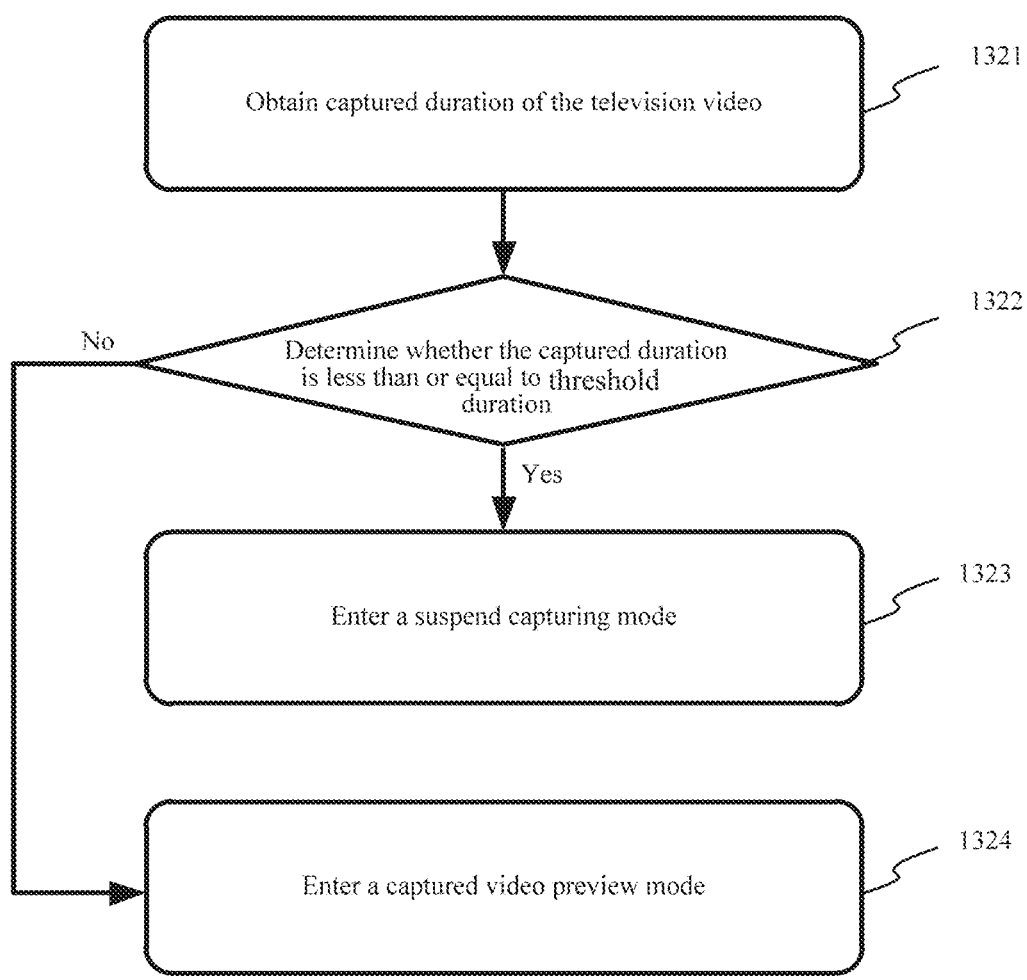
FIG. 3 is another flowchart of a method for entering a video capture mode in response to a capture instruction according to an embodiment.

Referring to FIG. 3, in another implementation, the entering a video capture mode in response to the capture instruction for the television video may include the following steps:

Step 1321. Obtain captured duration of the television video.

After receiving the capture instruction for the television video, the background server starts to capture the television video, and when receiving the stop capture instruction, stops capturing the television video. For example, the user long presses the first button of the remote control device, generates the capture instruction for the television video, and sends the capture instruction to the television. The television sends the received capture instruction to the background server. After receiving the capture instruction forwarded by the television, the background server starts to capture the television video. When the user releases the first button of the remote control device, the stop capture instruction for the television video is generated and sent to the television, and the television forwards the stop capture instruction to the background server. After receiving the stop capture instruction forwarded by the television, the background server stops capturing the television video. The television terminal obtains the captured duration of the television video. The captured duration is a time interval between when the capture instruction is received and when a stop capture instruction is received.

Step 1322. Upload the captured duration of the television video to the background server, so that the background server determines whether the captured duration is less than or equal to a threshold duration.

After obtaining the captured duration of the television video from the television, the background server determines whether the captured duration is less than or equal to the threshold captured duration. The threshold duration may be preset. When the captured duration is extremely short, there is insufficient time to generate continuous pictures that can be recognized by human eyes, and there is insufficient time to generate a captured video. The threshold duration is a duration used for determining whether a captured video can be generated.

Step 1323. Receive a determining result from the background server, and enter a suspend capturing mode if the background server determines that the captured duration is less than or equal to the preset captured duration.

In this embodiment, if the background server determines that the captured duration is less than or equal to the threshold duration, the television enters the suspend capturing mode. The background server suspends capturing of the television video in the suspend capturing mode. In the suspend capturing mode, the playback page of the television video may display a function button in the suspend capturing mode. The function button in the suspend capturing mode can be used to suspend capturing of the television video. The playback page of the television video may further display prompt information used for prompting suspend capturing operation information for the television video. When receiving the capture instruction again, the television enters the video capture mode, and the background server may continue to capture the television video, so that the television video is in a capturing state.

Step 1324. Receive a determining result from the background server, and enter a captured video preview mode if the background server determines that the captured duration is greater than the threshold duration.

After the background server determines that the captured duration is greater than the threshold duration, the television enters the captured video preview mode. The captured video of the television video may be displayed in the captured video preview mode.

In some implementations, the background server detects a time at which the capture instruction is received and a time at which the stop capture instruction is received, and determines the captured duration of the television video. If it is determined that the captured duration is greater than a maximum threshold duration, the process of capturing the television video ends, and the television enters the captured video preview mode. In the captured video preview mode, the playback page of the television video may display a function button in the captured video preview mode. The function button in the captured video preview mode can be operated to display the captured video.

Figure 4:
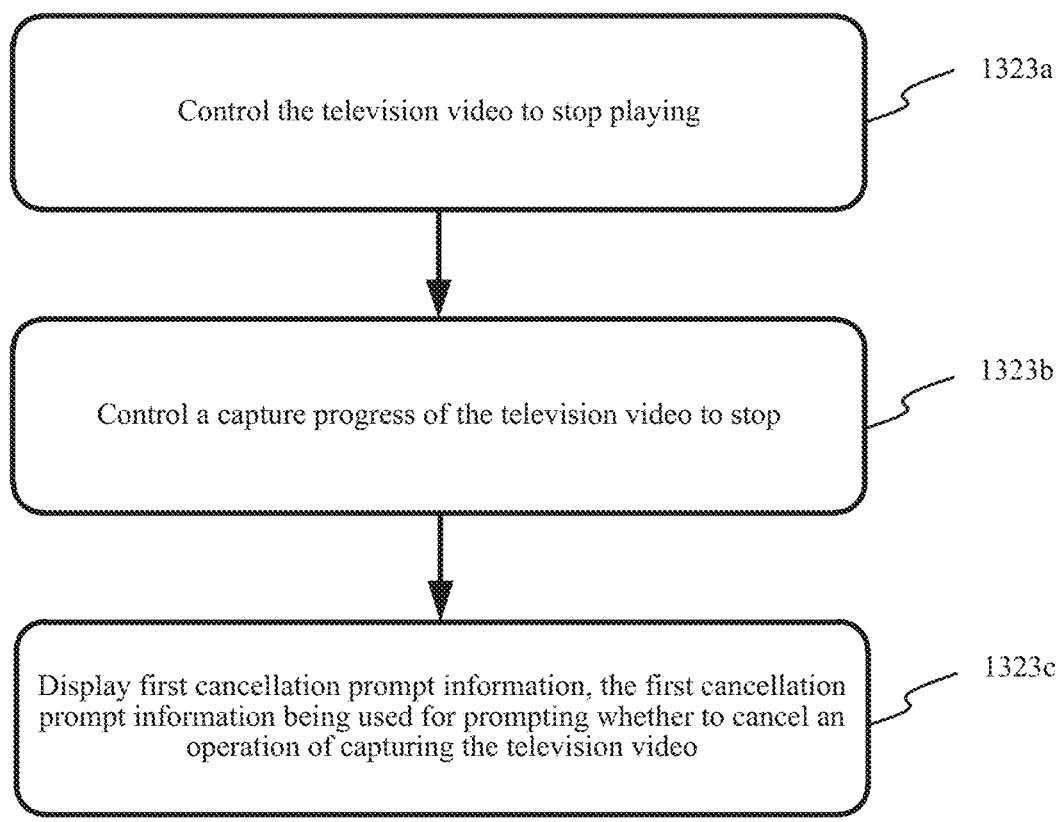
FIG. 4 is a flowchart of a method for entering a suspend capturing mode according to an embodiment.

Referring to FIG. 4, in an implementation, the entering a suspend capturing mode if it is determined that the captured duration is less than or equal to the threshold duration may include the following steps:

Step 1323a. Control the television video to stop playing.

When the television video is playing, the television video is controlled, in the suspend capturing mode, to stop playing.

Step 1323b. Control a capture progress of the television video to stop.

The captured duration of the television video corresponds to the capture progress of the television video. In the suspend capturing mode, the capture progress of the television video is controlled to stop. The capture progress of the television video may be displayed on the playback page of the television video. For example, color information may be used to display the capture progress of the television video. A change in color shade may be used to display the capture progress of the television video, or a color display progress bar may be used to display the capture progress of the television video.

Step 1323c. Display first cancellation prompt information, the first cancellation prompt information being used for prompting whether to cancel an operation of capturing the television video.

The first cancellation prompt information is displayed on the playback page of the television video, to prompt whether to cancel the operation of capturing the television video. Capturing of the television video is cancelled when a first cancellation indication signal is received. The first cancellation indication signal may be generated by the user by operating a confirm button of the remote control device. For example, the first cancellation prompt information "Cancel capturing of the television video?" is displayed on the playback page of the television video. The user may press the confirm button in the remote control device to generate the first cancellation indication signal. When receiving the first cancellation indication signal, the television instructs the background server to cancel capturing of the television video, and the television video restores to an uncaptured state, may continue to play.

Figure 5:
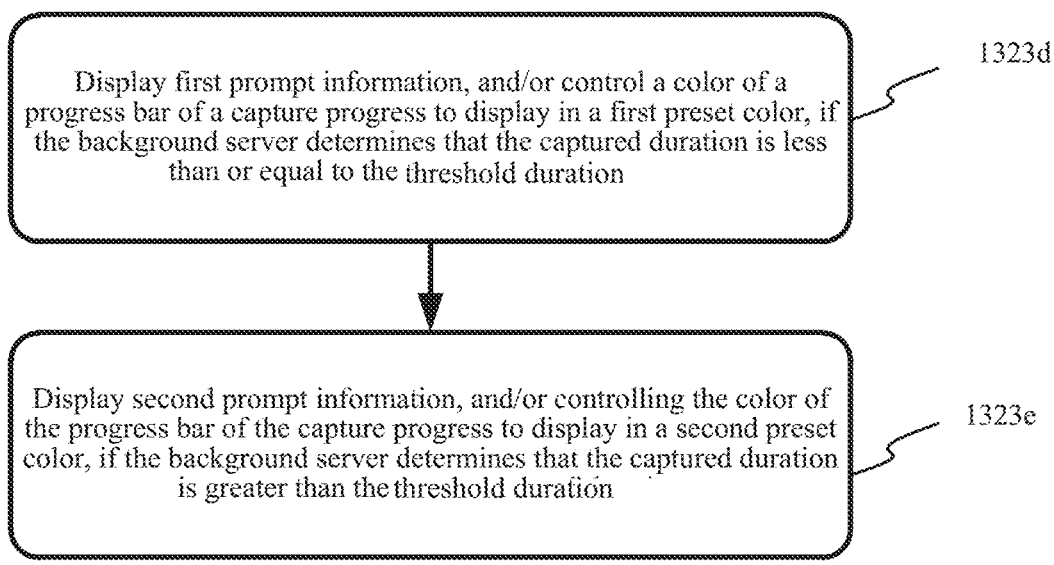
FIG. 5 is another flowchart of a method for entering a suspend capturing mode according to an embodiment.

Referring to FIG. 5, in an implementation, if the background server determines that the captured duration is less than or equal to the threshold duration, after the television terminal enters the suspend capturing mode, the method may further include the following steps:

Step 1323d. Display first prompt information, and/or control a color of a progress bar of a capture progress to display in a first preset color, if the background server determines that the captured duration is less than or equal to the threshold duration.

After the background server determines that the captured duration is less than or equal to the threshold duration, the television terminal displays the first prompt information, where the first prompt information is operation information used for prompting further generating of the captured video, and/or controls the color of the progress bar of the capture progress to display in the first preset color. For example, when the threshold duration is three seconds, if it is determined that the captured duration is less than or equal to three seconds, the first prompt information "Long press for more than three seconds" is displayed on the playback page of the television video. The prompt information indicates that when the captured duration is less than or equal to three seconds, the captured video cannot be generated, and the captured duration instructed by the user needs to be more than three seconds. For another example, the color of the progress bar of the capture progress is controlled to display in the first preset color, for example, orange, indicating that when the captured duration is extremely short, the captured video cannot be generated.

Step 1323e. Display second prompt information, and/or controlling the color of the progress bar of the capture progress to display in a second preset color, if the background server determines that the captured duration is greater than the threshold duration.

After the background server determines that the captured duration is greater than the threshold duration, the television terminal displays the second prompt information, where the second prompt information is operation information used for prompting ending of generation of the captured video, and/or controls the color of the progress bar of the capture progress to display in the second preset color. For example, when the threshold duration is three seconds, if it is determined that the captured duration is greater than three seconds, the second prompt information "You may release at any time" may be displayed on the playback page of the television video, indicating that when the captured duration is greater than three seconds, the captured video of the television video may be generated, and the user may release the first button of the remote control device at any time. For another example, the color of the progress bar of the capture progress is controlled to display in the second preset color, for example, green, indicating that the captured video may have been generated according to the captured duration, and the user may release the first button of the remote control device at any time. When the television video enters the capturing mode, the capture button changes to orange, and there is a water ripple animation around the capture button, to notify the user that the television video enters the capturing mode. In the suspend capturing mode, the capture button is still orange, and there is still a water ripple animation around the capture button, to notify the user terminal that capturing of the television video may continue.

When the television video is in the suspend capturing mode, and when the capture instruction is received again, the capture progress resumes from the capture progress when the capturing is suspended, and starts to refresh, and the television video is in a state that is the same as the state in the capturing mode.

Figure 6:
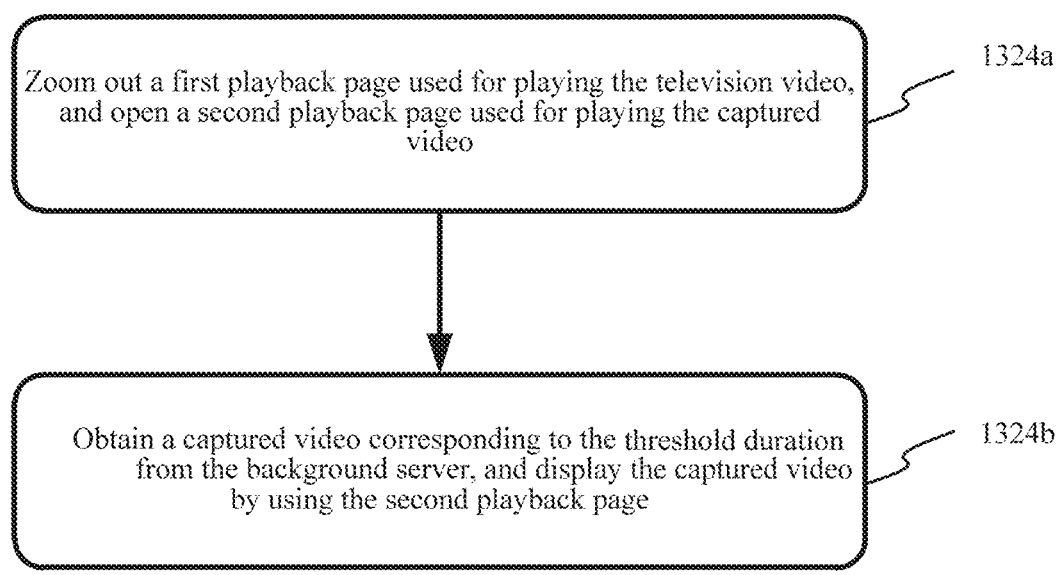
FIG. 6 is a flowchart of a method for entering a captured video preview mode according to an embodiment.

Referring to FIG. 6, in an implementation, the entering a captured video preview mode if it is determined that the captured duration is greater than the threshold duration may include the following steps:

Step 1324a. Zoom out a first playback page used for playing the television video, and open a second playback page used for playing the captured video.

In this embodiment, the playback page of the television video is referred to as the first playback page, and the first playback page may display the television video. The first playback page may play the television video in a form of a player. After the a captured video preview mode is entered, the second playback page may be opened, to play the captured video. When it is determined that the captured duration is greater than the threshold duration, the captured video preview mode for previewing the captured video is entered. In this case, the first playback page may be zoomed out, and the second playback page may be opened. The second playback page may be set to distinguish from the first playback page used for playing the television video. For example, white edges may be set around the second playback page.

Step 1324b. Obtain a captured video corresponding to the captured duration from the background server, and display the captured video by using the second playback page.

After the background server generates the captured video of the television video according to the captured duration, the television terminal may obtain the captured video, and display the captured video by using the second playback page. After it is determined that the captured duration is greater than the threshold duration, the television terminal obtains the captured video corresponding to the captured duration, and displays the captured video by using the second playback page. The captured video may be repeatedly played on the second playback page.

After step 1324b, the method may further include the following step:

obtaining a screenshot of the captured video from the background server, and using the screenshot as a background picture of the second playback page.

After the first playback page is zoomed out and the second playback page is opened, the screenshot of the captured video may be obtained from the background server. The screenshot of the captured video is a screenshot that is obtained by randomly capturing content already played of the captured video, and the screenshot is used as the background picture of the second playback page.

When displaying the captured video, the second playback page may further display the second cancellation prompt information used for prompting cancellation of the display of the captured video. When the second cancellation indication signal is received, the display of the captured video is cancelled and the second playback page is closed. The first playback page is restored to an original size, and the first playback page continues to display the television video.

In this embodiment, a cancel button may be displayed on the second playback page, and the user may operate the cancel button on the second playback page by using the remote control device, to generate the second cancellation prompt signal. After receiving the second cancellation prompt signal from the user, the television cancels the display of the captured video.

In an implementation, the receiving a share instruction signal of the captured video, and forwarding the share instruction signal to the background server, so that the background server shares the captured video on a social platform may include the following steps:

receiving the share instruction signal of the captured video that is generated by the user by operating a second button of the remote control device, information about the share instruction signal including at least account information on the social platform; and uploading information about the received share instruction signal to the background server; and sending, by the background server, the captured video of the television video to a social platform server according to the information about the received share instruction signal, and sharing, by using the social platform server, the captured video on a social platform corresponding to the account information.

Specifically, the background server may obtain the account information on the social platform, and may query an account status by using the social platform server. If a social platform account is logged in and valid, the background server shares, according to the information about the received share instruction signal by using the social platform server, the captured video of the television video on the social platform corresponding to the account information. If the social platform account is not logged in, the background server generates login prompt information by using the social platform server. If the social platform account is in a disabled state, the background server sends prompt information to a public information area of the social platform by using the social platform server.

According to the foregoing steps of this embodiment, after obtaining a television video, a television terminal receives and responds to a capture instruction for the television video, forwards the capture instruction to a background server, and enters a video capture mode, so as to capture the television video by using the background server in the video capture mode, and generate a captured video of the television video. Subsequently, the background server receives a share instruction signal of the captured video, and shares the captured video on a social platform by using a social platform server. This embodiment provides a technology for capturing and sharing a television video being played on line, so that a user can capture and share interesting video content while watching a television video. In this way, a video capture operation that, in the related art, can be performed only on a computer or a mobile terminal is extended to the television field, thereby resolving the technical problem in the related art technology that a television video cannot be captured and shared.

Figure 7:
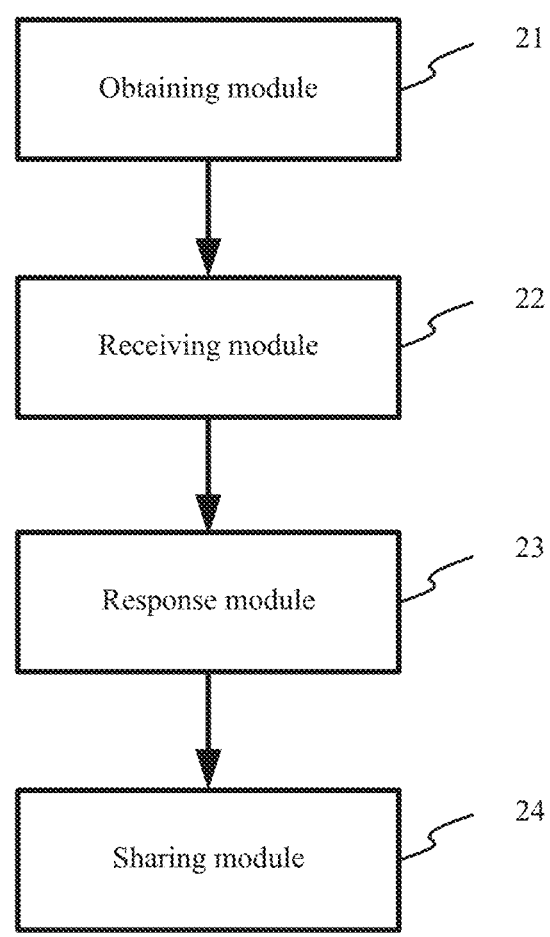
FIG. 7 is a structural block diagram of an apparatus for capturing a television video according to an embodiment.

Referring to FIG. 7, FIG. 7 shows a structural block diagram of an apparatus for capturing a television video according to an embodiment. The apparatus includes an obtaining module 21, a receiving module 22, and a response module 23.

The obtaining module 21 is configured to: obtain a television video from a background server and display the television video.

The receiving module 22 is configured to receive a capture instruction for the television video, the capture instruction being generated by a user by operating a first button of a remote control device.

The response module 23 is configured to: in response to the capture instruction for the television video, forward the capture instruction to the background server, and enter a video capture mode, the background server generating a captured video of the television video in the video capture mode.

Referring to FIG. 7, further, in this embodiment, the apparatus may further include a sharing module 24.

The sharing module 24 is configured to: receive a share instruction signal of the captured video, and forward the share instruction signal to the background server, so that the background server shares the captured video on a social platform, the share instruction signal being generated by the user by operating a second button of the remote control device.

Figure 8:
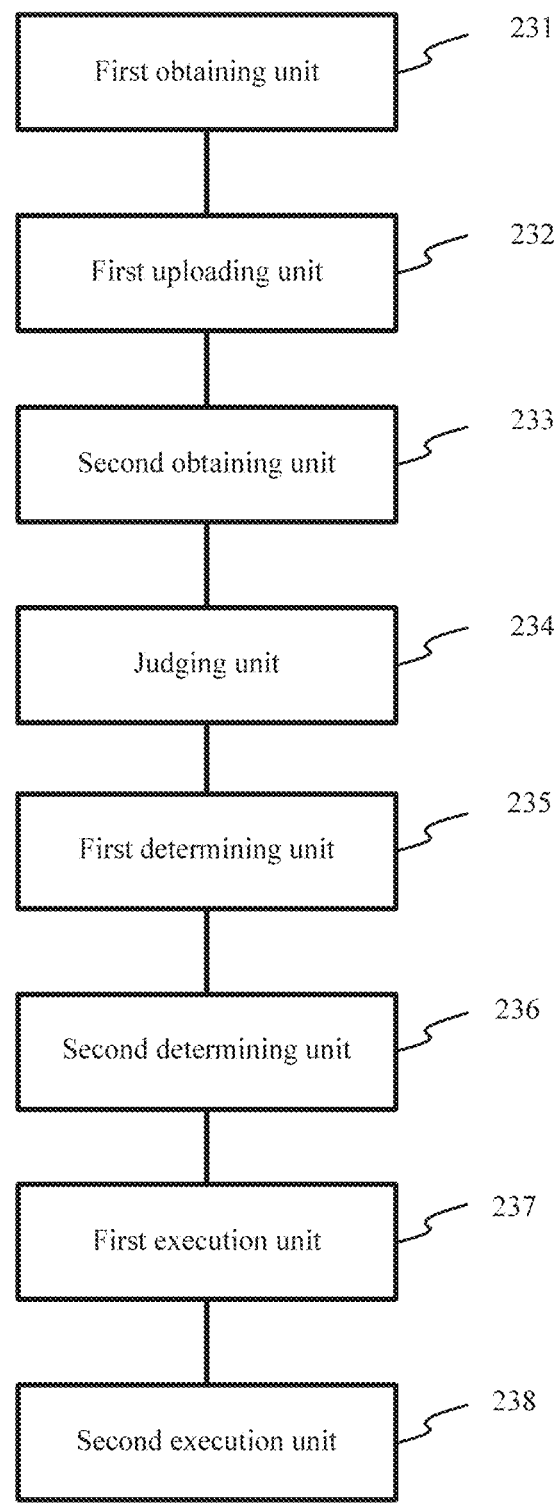
FIG. 8 is a structural block diagram of a response module in an apparatus for capturing a television video according to an embodiment.

Referring to FIG. 8, the response module 23 may include a first obtaining unit 231 and a first uploading unit 232.

The first obtaining unit 231 is configured to obtain identifier information of the television video, and a capture start time and a capture end time of the television video.

The first uploading unit 232 is configure to upload the identifier information of the television video, and the capture start time and the capture end time of the television video to the background server.

Referring to FIG. 8, the response module 23 may further include a second obtaining unit 233, a judging unit 234, a first determining unit 235, and a second determining unit 236.

The second obtaining unit 233 is configured to obtain captured duration of the television video, the captured duration being a time interval between when the capture instruction is received and when a stop capture instruction is received.

The judging unit 234 is configured to determine whether the captured duration is less than or equal to threshold duration.

The first determining unit 235 is configured to: enter a suspend capturing mode when the judging unit 234 determines that the captured duration is less than or equal to the threshold duration, where capturing of the television video in the suspend capturing mode is suspended; and enter the video capture mode when the capture instruction is received again, where the capturing of the television video may continue.

The second determining unit 236 is configured to enter a captured video preview mode if the judging unit 234 determines that the captured duration is greater than the threshold duration, where the captured video of the television video may be displayed in the captured video preview mode.

Figure 9:
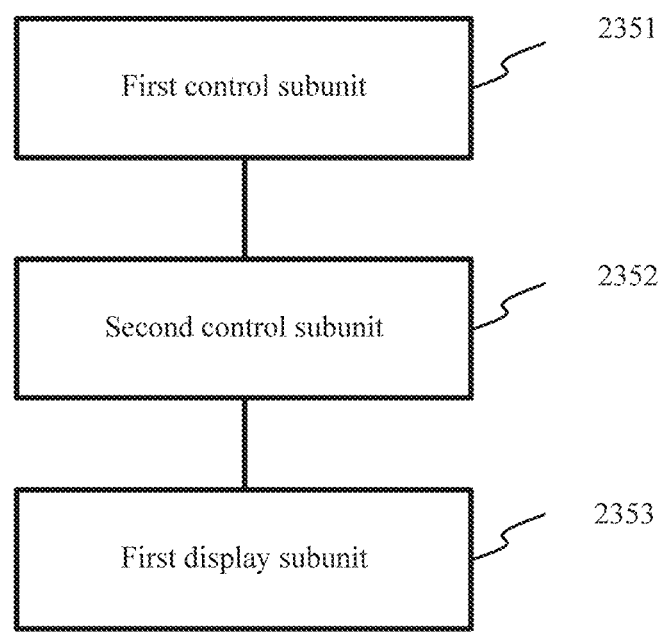
FIG. 9 is a structural block diagram of a first determining unit in an apparatus for capturing a television video according to an embodiment.

Referring to FIG. 9, the first determining unit 235 may include a first control subunit 2351, a second control subunit 2352, and a first display subunit 2353.

The first control subunit 2351 is configured to control the television video to stop playing.

The second control subunit 2352 is configured to control a capture progress of the television video to stop.

The first display subunit 2353 is configured to: display first cancellation prompt information, the first cancellation prompt information being used for prompting whether to cancel an operation of capturing the television video; and cancel capturing of the television video when a first cancellation indication signal is received.

Referring to FIG. 8, the response module 23 may include a first execution unit 237 and a second execution unit 238.

The first execution unit 237 is configured to: display first prompt information, and/or control a color of a progress bar of a capture progress to display in a first preset color, when the judging unit 234 determines that the captured duration is less than or equal to the threshold duration.

The second execution unit 238 is configured to: display second prompt information, and/or controlling the color of the progress bar of the capture progress to display in a second preset color, when the judging unit 234 determines that the captured duration is greater than the threshold duration.

Figure 10:
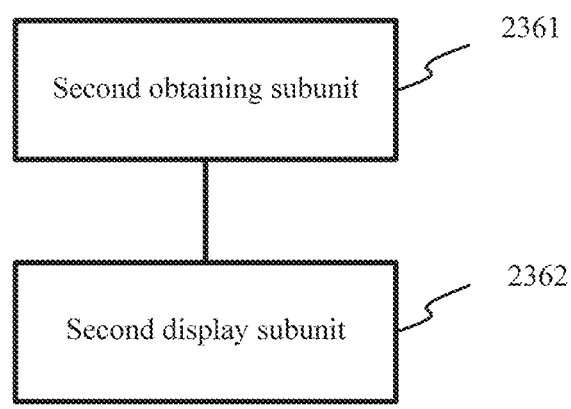
FIG. 10 is a structural block diagram of a second determining unit in an apparatus for capturing a television video according to an embodiment.

Referring to FIG. 10, the second determining unit 236 may include a second obtaining subunit 2361 and a second display subunit 2362.

The second obtaining subunit 2361 is configured to: zoom out a first playback page used for playing the television video, and open a second playback page used for playing the captured video; and obtain a screenshot of the captured video, and use the screenshot as a background picture of the second playback page.

The second display subunit 2362 is configured to: obtain a captured video corresponding to the captured duration, and display the captured video by using the second playback page; display second cancellation prompt information used for prompting cancellation of displaying the captured video; and cancel display of the captured video when a second cancellation indication signal is received, close the second playback page, and restore the first playback page to an original size, the first playback page continuing to display the television video.

Figure 11:
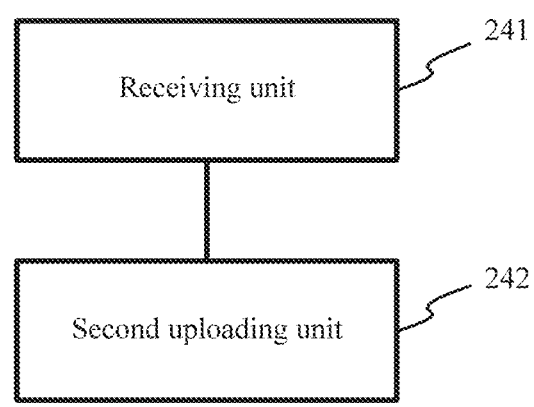
FIG. 11 is a structural block diagram of a sharing module in an apparatus for capturing a television video according to an embodiment.

Referring to FIG. 11, the sharing module 24 may include a receiving unit 241 and a second uploading unit 242.

The receiving unit 241 is configured to receive the share instruction signal of the captured video that is generated by the user by operating a second button of the remote control device, information about the share instruction signal including at least account information on the social platform.

The second uploading unit 242 is configured to upload information about the received share instruction signal to the background server.

The background server sends the captured video of the television video to a social platform server according to the information about the received share instruction signal, and shares, by using the social platform server, the captured video on a social platform corresponding to the account information.

Specifically, the background server may obtain the account information on the social platform, and queries an account status by using the social platform server. If a social platform account is logged in and valid, the background server shares, according to the information about the received share instruction signal by using the social platform server, the captured video of the television video on the social platform corresponding to the account information. If the social platform account is not logged in, the background server generates login prompt information by using the social platform server. If the social platform account is in a disabled state, the background server sends prompt information to a public information area of the social platform by using the social platform server.

According to the foregoing apparatus, after obtaining a television video, a television terminal receives and responds to a capture instruction for the television video, forwards the capture instruction to a background server, and enters a video capture mode, so as to capture the television video by using the background server in the video capture mode, and generate a captured video of the television video. Subsequently, the background server receives a share instruction signal of the captured video, and shares the captured video on a social platform by using a social platform server. This embodiment provides a technology for capturing and sharing a television video being played on line, so that a user can capture and share interesting video content while watching a television video. In this way, a video capture operation that, in the related art, can be performed only on a computer or a mobile terminal is extended to the television field, thereby resolving the technical problem in the related art technology that a television video cannot be captured and shared.

Figure 12:
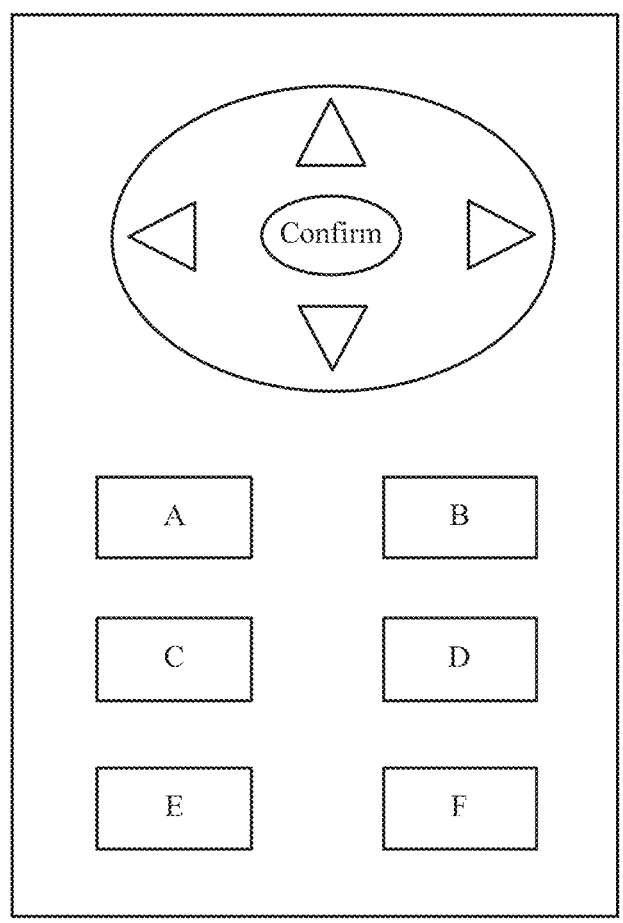
FIG. 12 is a schematic structural diagram of a remote control device according to an embodiment.

FIG. 12 is a schematic structural diagram of a remote control device according to an embodiment. The "confirm" button of the remote control device may be long pressed to generate the capture instruction to start to capture the television video, and when the "confirm" button is released, the capturing ends. Alternatively, the confirm button may be clicked (i.e., a short press) to send the share instruction signal of the captured video. Therefore, the first button and the second button in the foregoing embodiments may be a same button or may be different buttons. It should be noted that with development of intelligent television manufacturing technologies and continuous improvement of hardware specifications and intelligence levels of intelligent televisions, existing intelligent televisions and remote control devices already can be not limited to a conventional control mode by remote controllers. During use of the intelligent televisions, other peripheral devices may also be used to control the intelligent televisions and interact with the intelligent televisions. These peripheral devices may include an intelligent mobile communications device, a palmtop computer, and the like. During use, application programs may be installed in these peripheral control devices, to implement a control or interaction function with the intelligent televisions.

Figure 13:
FIG. 13 to FIG. 15 are schematic diagrams of a capturing and sharing process of a television video according to an embodiment.
Figure 14:
Figure 15:
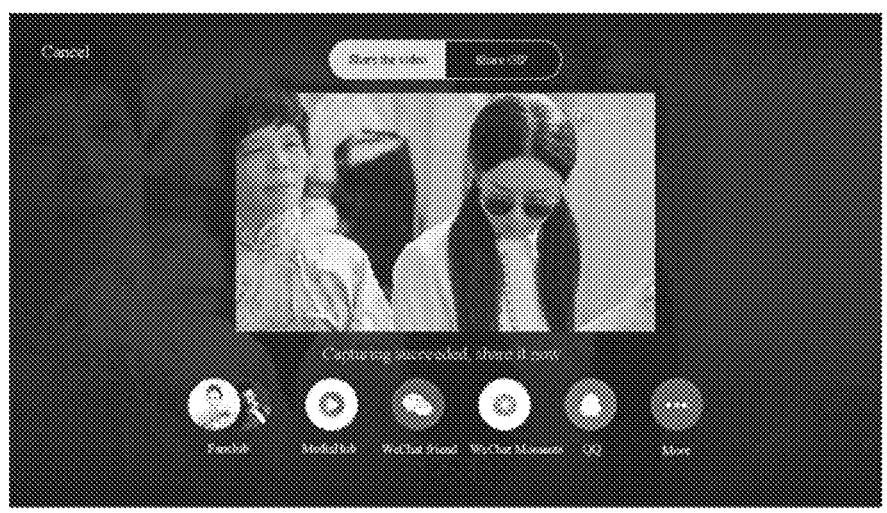

FIG. 13 to FIG. 15 are schematic diagrams of a video capture process according to an embodiment. FIG. 13 is a display picture when a first button of a remote control device is operated to generate a capture instruction. FIG. 14 is a display picture when a first button of a remote control device is operated to end capturing. FIG. 15 is a display picture when a captured video is shared.

Based on the structure of the terminal shown in FIG. 1A and the implementation environment shown in FIG. 1B, an embodiment further provides an apparatus for capturing a television video. The apparatus includes one or more processors and one or more non-volatile storage mediums. The one or more non-volatile storage mediums store one or more computer-readable instructions, to be executed by the one or more processors to implement the method for capturing a television video shown in FIG. 1C to FIG. 6.

An embodiment further provides a non-volatile computer-readable storage medium, storing a computer-readable instruction. The computer-readable instruction is capable of causing at least one processor to perform the foregoing method for capturing a television video.

It should be noted that the sequence numbers of the foregoing exemplary embodiments are merely for description purpose but do not represent the preference of the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments, but are not intended to limit the present disclosure. Any modification, equivalent replacement, or improvement made within the spirit and principle of the present disclosure shall fall within the protection scope of the present disclosure and its appended claims.

What is claimed is:

1. A method comprising:
   obtaining, by at least one processor, a television video from a background server and displaying the television video;
   receiving, by the at least one processor, a capture instruction for the television video from a remote control device; and
   in response to receiving the capture instruction, transmitting the capture instruction to the background server, and entering a video capture mode,
   wherein entering the video capture mode comprises:
   obtaining captured duration of the television video, the captured duration being a time interval between a time at which the capture instruction is received and a time at which a stop capture instruction is received;
   uploading the captured duration of the television video to the background server;
   receiving a notification of whether the captured duration is less than or equal to a threshold duration from the background server;
   in response to the notification indicating the captured duration is less than or equal to the threshold duration, entering a suspend capturing mode, and entering the video capture mode in response to the capture instruction being received again; and
   in response to the notification indicating the captured duration is greater than the threshold duration, entering a captured video preview mode, and displaying the captured video of the television video.

2. The method according to claim 1, wherein entering the video capture mode comprises:
   obtaining identifier information of the television video, and a capture start time and a capture end time of the television video, the identifier information being used for determining information about the television video; and
   uploading the identifier information of the television video, and the capture start time and the capture end time of the television video, to the background server.

3. The method according to claim 1, wherein entering the suspend capturing mode comprises:
   controlling the television video to stop playing;
   controlling a capture progress of the television video to stop;
   displaying first cancellation prompt information, the first cancellation prompt information being used for prompting whether to cancel an operation of capturing the television video; and
   instructing the background server to cancel capturing of the television video in response to a first cancellation indication signal being received.

4. The method according to claim 1, further comprising:
   in response to the captured duration being less than or equal to the threshold duration, displaying first prompt information, and/or controlling a color of a progress bar of a capture progress to display in a first color, the first prompt information being operation information used for prompting further generating of the captured video; and
   in response to the captured duration being greater than the threshold duration, displaying second prompt information, and/or controlling the color of the progress bar of the capture progress to display in a second color, the second prompt information being operation information used for prompting ending of generation of the captured video.

5. The method according to claim 1, wherein entering the captured video preview mode comprises:
   zooming out a first playback page used for playing the television video, and opening a second playback page used for playing the captured video; and
   obtaining a captured video generated according to the threshold duration from the background server, and displaying the captured video by using the second playback page.

6. The method according to claim 5, wherein after the zooming out, the method further comprises:
   obtaining a screenshot of the captured video from the background server, and using the screenshot as a background picture of the second playback page;
   displaying second cancellation prompt information for prompting cancellation of displaying the captured video; and
   cancelling display of the captured video in response to a second cancellation indication signal being received, closing the second playback page, and restoring the first playback page to an original size, the first playback page continuing to display the television video.

7. The method according to claim 1, further comprising:
receiving a share instruction signal for sharing the captured video, and forwarding the share instruction signal to the background server,
wherein the captured video is shared on a social platform by the background server.

8. The method according to claim 7, wherein the share instruction signal is received from the remote control device, the share instruction signal comprising at least account information on the social platform; and
uploading the at least account information to the background server,
wherein the captured video of the television video is transmitted to a social platform server according to the at least account information, and shared on a social platform corresponding to the at least account information.

9. A system comprising:
a background server; and
a terminal comprising:
at least one terminal memory configured to store terminal computer program code; and
at least one terminal processor configured to access the at least one terminal memory and operate according to the terminal computer program code, the terminal computer program code including:
obtaining code configured to cause at least one of the at least one terminal processor to obtain a television video from the background server and display the television video;
receiving code configured to cause at least one of the at least one terminal processor to receive a capture instruction for the television video from a remote control device; and
transmitting code configured to cause at least one of the at least one terminal processor to, in response to receiving the capture instruction, transmit the capture instruction to the background server, and enter a video capture mode,
wherein the background server comprises:
at least one server memory configured to store server computer program code; and
at least one server processor configured to access the at least one server memory and operate according to the server computer program code, the server computer program code including:
generating code configured to cause at least one of the at least one server processor to generate a captured video of the television video in the video capture mode,
wherein the terminal computer program code comprises:
duration obtaining code configured to cause at least one of the at least one terminal processor to obtain captured duration of the television video, the captured duration being a time interval between a time at which the capture instruction is received and a time at which a stop capture instruction is received;
uploading code configured to cause at least one of the at least one terminal processor to upload the captured duration of the television video to the background server;
reception code configured to cause at least one of the at least one terminal processor to receive a notification of whether the captured duration is less than or equal to a threshold duration from the background server, and in response to the notification indicating that the captured duration is less than or equal to the threshold duration, enter a suspend capturing mode, and in response to the notification indicating that the captured duration is greater than the threshold duration, enter a captured video preview mode, and
wherein the server computer program code comprises:
determining code configured to cause at least one of the at least one server processor to determine whether the captured duration is less than or equal to a threshold duration and transmit a notification of a result of the determination to the terminal; and
suspension code configured to cause at least one of the at least one server processor to suspend capturing of the television video in response to the suspend capturing mode being entered.

10. The system according to claim 9, wherein the terminal computer program code comprises:
parameter obtaining code configured to cause at least one of the at least one terminal processor to obtain identifier information of the television video, and a capture start time and a capture end time of the television video, the identifier information for determining information about the television video; and
obtaining code configured to cause at least one of the at least one terminal processor to upload the identifier information of the television video, and the capture start time and the capture end time of the television video, to the background server,
wherein the server computer program code comprises:
first generation code configured to cause at least one of the at least one server processor to search for a television video corresponding to the identifier information of the television video, and generate the captured video of the television video according to the capture start time and the capture end time of the television video; or
second generation code configured to cause at least one of the at least one server processor to search for a video clip corresponding to the identifier information of the television video, and the capture start time and the capture end time of the television video, and generate the captured video of the television video according to the found video clip.

11. The system according to claim 9, wherein the terminal computer program code comprises:
first displaying code configured to cause at least one of the at least one terminal processor to, in response to the notification indicating the captured duration is less than or equal to the threshold duration, display first prompt information, and/or controlling a color of a progress bar of a capture progress to display in a first color, the first prompt information being operation information for prompting further generating of the captured video; and
second displaying code configured to cause at least one of the at least one terminal processor to, in response to the notification indicating the captured duration is greater than the threshold duration, display second prompt information, and/or controlling the color of the progress bar of the capture progress to display in a second color, the second prompt information being operation information for prompting ending of generation of the captured video.

12. The system according to claim 9, wherein the terminal computer program code comprises:
sharing reception code configured to cause at least one of the at least one terminal processor to receive a share instruction signal of the captured video, and transmit the share instruction signal to the background server, and wherein the server computer program code comprises:
sharing code configured to cause at least one of the at least one server processor to, in response to receiving the share instruction signal, share the captured video on a social platform.

13. The system according to claim 12, wherein the share instruction signal is received from the remote control device, the share instruction signal comprising information including at least account information on the social platform; and
the terminal computer program code comprises sharing signal uploading code configured to cause at least one of the at least one terminal processor to upload the at least account information to the background server,
wherein the sharing code is further configured to cause the at least one of the at least one server processor to transmit the captured video of the television video to a social platform server according to the at least account information, and to cause the social platform server to share the captured video on the social platform corresponding to the at least account information.

14. A non-transitory computer-readable storage medium storing computer program code which, when executed by at least one processor, performs operations comprising:
obtaining a television video from a background server and displaying the television video;
receiving a capture instruction for the television video from a remote control device; and
in response to receiving the capture instruction, transmitting the capture instruction to the background server, and entering a video capture mode,
wherein entering the video capture mode comprises:
obtaining captured duration of the television video, the captured duration being a time interval between a time at which the capture instruction is received and a time at which a stop capture instruction is received;
uploading the captured duration of the television video to the background server;
receiving a notification of whether the captured duration is less than or equal to a threshold duration from the background server;
in response to the notification indicating the captured duration is less than or equal to the threshold duration, entering a suspend capturing mode, and entering the video capture mode in response to the capture instruction being received again; and
in response to the notification indicating the captured duration is greater than the threshold duration, entering a captured video preview mode, and displaying the captured video of the television video.

15. The computer-readable storage medium according to claim 14, wherein entering the video capture mode comprises:
obtaining identifier information of the television video, and a capture start time and a capture end time of the television video, the identifier information being used for determining information about the television video; and
uploading the identifier information of the television video, and the capture start time and the capture end time of the television video, to the background server.

16. The computer-readable storage medium according to claim 14, wherein entering the suspend capturing mode comprises:
controlling the television video to stop playing;
controlling a capture progress of the television video to stop;
displaying first cancellation prompt information, the first cancellation prompt information being used for prompting whether to cancel an operation of capturing the television video; and
instructing the background server to cancel capturing of the television video in response to a first cancellation indication signal being received.

17. The computer-readable storage medium according to claim 14, further comprising:
in response to the captured duration being less than or equal to the threshold duration, displaying first prompt information, and/or controlling a color of a progress bar of a capture progress to display in a first color, the first prompt information being operation information used for prompting further generating of the captured video; and
in response to the captured duration being greater than the threshold duration, displaying second prompt information, and/or controlling the color of the progress bar of the capture progress to display in a second color, the second prompt information being operation information used for prompting ending of generation of the captured video.

* * * * *